United States Patent
Matsumoto et al.

(10) Patent No.: US 7,489,108 B2
(45) Date of Patent: Feb. 10, 2009

(54) METHOD OF CONTROLLING BATTERY CURRENT LIMIT VALUES

(75) Inventors: Kenshi Matsumoto, Kasai (JP); Shigeto Tamezane, Takasago (JP)

(73) Assignee: Sanyo Electric Co., Ltd., Osaka (JP)

( * ) Notice: Subject to any disclaimer, the term of this patent is extended or adjusted under 35 U.S.C. 154(b) by 451 days.

(21) Appl. No.: 11/324,259

(22) Filed: Jan. 4, 2006

(65) Prior Publication Data

US 2006/0152196 A1 Jul. 13, 2006

(30) Foreign Application Priority Data

Jan. 13, 2005 (JP) ............................... 2005-006815

(51) Int. Cl.
*H01M 10/46* (2006.01)
(52) U.S. Cl. ....................................................... 320/132
(58) Field of Classification Search ................. 320/132, 320/135, 152, 157, 160, 162
See application file for complete search history.

(56) References Cited

U.S. PATENT DOCUMENTS 6,891,355 B2 * 5/2005 Kernahan .................... 323/282
7,089,127 B2 * 8/2006 Thibedeau et al. ............ 702/63
2007/0065713 A1 * 3/2007 Rauchfuss .................... 429/66

FOREIGN PATENT DOCUMENTS

| JP | 56-126776 | 10/1981 |
|----|-----------|---------|
| JP | 9-84205 | 3/1997 |
| JP | 9-171063 | 6/1997 |
| JP | 9-312901 | 12/1997 |
| JP | 2002-291104 | 10/2002 |

* cited by examiner

*Primary Examiner*—Edward Tso
(74) *Attorney, Agent, or Firm*—Wenderoth, Lind & Ponack, L.L.P.

(57) ABSTRACT

A method of controlling battery current limit values, the method controls maximum charging and discharging current values according to the state of charge of the battery. The method of controlling current limits integrates battery charging and discharging current to compute a first state of charge, determines first charging and discharging current limit value candidates from that first state of charge, computes a second state of charge based on battery voltage, and determines second charging and discharging current limit value candidates from that second state of charge. Further, the method takes the smaller of the first and second charging and discharging current limit value candidates as the charging and discharging current limit values for charging and discharging the battery.

19 Claims, 3 Drawing Sheets

METHOD OF CONTROLLING BATTERY CURRENT LIMIT VALUES

BACKGROUND OF THE INVENTION

This invention relates to a method of limiting maximum charging and discharging current values based on the state of charge or remaining capacity of the battery, and for example, relates to a method of controlling battery current limiting to limit maximum current through batteries included in a power source apparatus for powering the driving motor a car.

Batteries have the property that their electrical characteristics degrade if discharged at high current when their state of charge is low, or if charged with high current when their state of charge is high. For this reason it is important to limit maximum charging and discharging currents for batteries in a power source apparatus that, for example, powers a car driving motor. If maximum current is not limited, rapid car acceleration when the state of charge of the battery is low can cause battery voltage to suddenly drop due to high discharge current. In addition, sudden braking when the state of charge of the battery is high can cause battery voltage to rise rapidly. In either case, degradation of battery characteristics is the detrimental result. In particular, since batteries of a car power source apparatus are charged and discharged with very high currents, battery life becomes extremely short if maximum currents are not limited. This is especially important for a power source apparatus used in applications that require high battery output such as cars or automobiles, bicycles, and tools Consequently, for high current charging and discharging without degrading battery electrical characteristics, it is important to limit discharging current when the state of charge of the battery becomes low to prevent over-discharging. Further, it is important to limit charging current when the state of charge of the battery becomes high to prevent over-charging. This is because over-discharging and over-charging reduce battery lifetime. Therefore, it is important to accurately detect the state of charge (SOC) of the battery and determine charging and discharging current limit values from the detected state of charge. Otherwise, if there is error in the detected state of charge, over-charging or over-discharging can markedly degrade battery characteristics.

Incidentally, the state of charge or remaining capacity of a battery is determined by subtracting battery discharge capacity from charge capacity. Battery charge capacity is computed from the integral of the charging current considering charging efficiency. Discharge capacity is computed from the integral of discharging current. Therefore, state of charge of the battery is computed during discharge by subtracting discharge capacity from the state of charge prior to discharge. Similarly, during charging, state of charge of the battery is computed by adding charge capacity to the state of charge prior to charging. By this method, the state of charge of the battery can be computed during charging and discharging. However, the state of charge computed by this method gradually accumulates error. Consequently, the state of charge computed from the integration of charging current and discharging current is not always in agreement with the correct state of charge of the battery. This is because factors such as the amount of discharge current and temperature can be sources of error.

In addition, there is also a method of determining the state of charge by measuring battery voltage, but this method as well cannot always determine the state of charge accurately. It is well known that a different battery voltage can be measured even at the same state of charge depending on factors such as the battery's charge-discharge history. Further, since there is a region where voltage changes little as a function of the state of charge for batteries such as nickel hydrogen and nickel cadmium batteries, it is difficult to estimate state of charge based on battery voltage alone.

In this manner, accurately determining the state of charge of the battery is difficult, and even at the same voltage and current values, the amount of usable power differs depending on factors such as state of charge and battery temperature. In particular, when the commonly described "memory effect" occurs, an actual decrease in battery capacity results, and battery state of charge determination becomes even more difficult. The memory effect is a phenomenon that occurs when a battery such as a nickel cadmium battery or nickel hydrogen battery is put through charge-discharge cycles with shallow discharge (low discharge levels not approaching full discharge). When a battery in this condition is deeply discharged, discharge voltage drops temporarily. Because the state of charge of the battery changes due to the memory effect, an accurate value of the state of charge cannot be estimated. If the state of charge of the battery is not determined accurately, battery over-load can occur during charging and discharging, and this can be a cause of marked reduction in battery lifetime. Meanwhile, change in the state of charge of the battery can also result from battery self-discharge. Because of these factors, estimation of the state of charge of the battery is difficult, and obtaining an accurate value of the state of charge is extremely problematical (see Japanese Patent Application Disclosure SHO 56-126776 (1981)).

SUMMARY OF THE INVENTION

The present invention was developed to solve the types of problems described above. Thus it is a primary object of the present invention to provide a method of controlling battery current limiting that can reduce battery degradation by limiting charging and discharging currents within acceptable ranges, even when the state of charge of the battery is not accurately determined from charging and discharging currents and voltages.

The method of controlling battery current limiting of the present invention is a method that limits maximum charging and discharging current values established from the state of charge of the battery. In the method of controlling current limit values, battery charging and discharging currents are integrated to compute a first state of charge, and first candidates for charging and discharging current limit values are determined from the computed first state of charge. A second state of charge is computed based on battery voltage, and second candidates for charging and discharging current limit values are determined from the computed second state of charge. Further, the method of controlling current limiting takes the smaller charging and discharging current limit values of the first and second candidates as the current limit values for charging and discharging the battery.

The method of controlling current limiting described above has the characteristic that even under conditions where the state of charge is not accurately determined from charging and discharging current and voltage, charging and discharging current can be limited within an acceptable range to allow battery charging and discharging while minimizing battery degradation. This is because the method above specifies charging and discharging current limits based on the state of charge that gives the smallest current limits. Namely, the first state of charge from integrated values of charging and discharging current, and the second state of charge from battery voltage are determined, and charging and discharging current limits are based on the state of charge that results in the smaller current limit values.

The first state of charge computed from the integral of current can accurately detect variation in the state of charge, but since error accumulates, error in the state of charge increases over time. Error in the state of charge can be corrected by charging the battery to full charge after complete discharge, or by completely discharging the battery after fully charging it. However, discharging to complete battery discharge or charging to a fully charged state are difficult to repeat frequently in practice. This is because battery characteristics become easily deteriorated as the state of charge approaches complete discharge and full charge, and characteristics are markedly degraded by over-charge and over-discharge. In addition, the battery cannot be further discharged in the fully discharged condition, and time is required to reach full charge. These factors also make repetition of complete discharge and charging to full charge difficult.

In the method described above, the second state of charge is determined by battery voltage. However, although the second state of charge can be accurately detected at complete discharge and at full charge, it has the drawback that an accurate state of charge cannot be detected from battery voltage at an intermediate value of state of charge. Further, to extend the lifetime of a battery installed in an automobile for example, charging and discharging is controlled to maintain the state of charge at an intermediate value. To extend battery lifetime as much as possible, the range of the state of charge is controlled to avoid complete discharge and full charge, where battery degradation increases. As a result, it is difficult to always accurately detect the second state of charge, which is determined from battery voltage.

For the reasons mentioned above, the first state of charge and second state of charge do not always accurately determine the state of charge of the battery. The method described above does not determine charging and discharging current limit values by detecting an accurate state of charge based on the first and second states of charge. Error included in the first and second states of charge may be reduced, but regardless what method of computation is used, a correct state of charge does not result. The present invention determines minimum charging and discharging current limit values from the first and second states of charge. Consequently, charging and discharging current limit values are set low, and although there may error in either the first state of charge or the second state of charge, the probability of high current flow that could cause battery degradation can be reduced.

In the method of controlling battery current limit values, the first state of charge is computed by integrating battery charging and discharging current, and the second state of charge is computed based on battery voltage. The maximum charging current value for battery charging is determined based on the larger state of charge of the first and second states of charge. The maximum discharging current value for battery discharge is determined based on the smaller state of charge of the first and second states of charge.

The method of determining the second state of charge, which is based on battery voltage, can find the state of charge based on battery voltage during charging when the state of charge is in a range that is greater than a set capacity, and it can find the state of charge based on battery voltage during discharging when the state of charge is in a range that is less than the set capacity.

The method of controlling current limiting described above has the characteristic that battery degradation due to excessive current can be very effectively prevented and battery life can be extended. This is because battery degradation due to over-charging and battery degradation due to over-discharging can be accurately controlled by charging and discharging current limit values based on the second state of charge, and thereby battery degradation can be prevented.

The first state of charge can be computed considering the charging efficiency of the batteries. The second state of charge can be determined based on a table of state of charge versus battery voltage. The second state of charge can be determined based on a functional relation between state of charge and battery voltage. The battery voltage for determining the second state of charge can be an average value of battery voltage over a specified time. The above and further objects and features of the invention will more fully be apparent from the following detailed description with accompanying drawings.

DETAILED DESCRIPTION OF THE PREFERRED EMBODIMENTS

Figure 1:
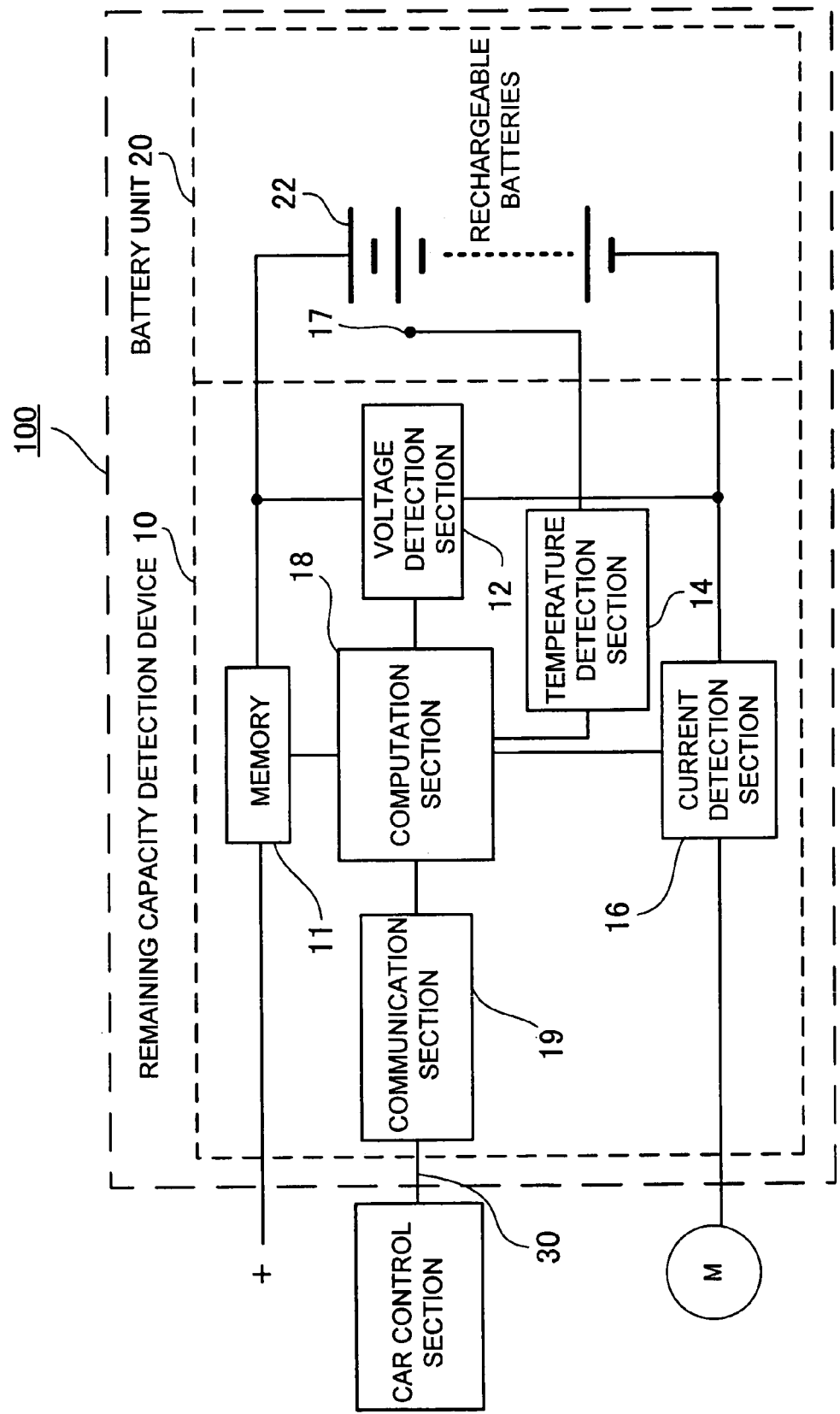
FIG. 1 is a block diagram showing one example of a power source apparatus used in an embodiment related to the method of controlling battery current limiting of the present invention.

Turning to FIG. 1, a block diagram showing the structure of one example of a power source apparatus used in an embodiment related to the method of controlling battery current limiting of the present invention is illustrated. The power source apparatus 100 of this figure is provided with a battery unit 20, which includes rechargeable batteries 22, and a remaining capacity detection device 10. The remaining capacity detection device 10 is provided with a voltage detection section 12 to detect battery voltage; a temperature detection section 14 to detect battery temperature; a current detection section 16 to detect battery current flow; a computation section 18 to operate on signals input from the voltage detection section 12, the temperature detection section 14, and the current detection section 16 and to determine the remaining capacity or state of charge of the battery and battery unit 20 maximum current limit values from the state of charge and battery temperature; and a communication section 19 to send the computed state of charge and maximum current limit values to the connected equipment. The communication section 19 connects to connected equipment communication terminals 30. The communication section 19 connects with the connected equipment via the connected equipment communication terminals 30, and sends signals to the connected equipment indicating the state of charge and maximum current limit values. In this example, a vehicle such as a car or automobile is used as the connected equipment, and the power source apparatus 100 is installed on-board the car to power an electric motor M, which drives the car. The communication section 19 connects with, and communicates with a car control section provided in the car. A power source apparatus for application in a car is described below.

Rechargeable batteries 22 housed in the battery unit 20 are nickel hydrogen batteries. However, the batteries can also be nickel cadmium batteries or lithium ion rechargeable batteries. The batteries can be a single battery or a plurality of batteries connected in series, in parallel, or in a combination of series and parallel. A plurality of batteries are connected together to form battery modules, and a plurality of battery modules are in turn connected together to form the battery unit 20.

The voltage detection section 12 detects the voltage of rechargeable batteries 22 housed in the battery unit 20. Since the battery unit 20 of the figure has a plurality of rechargeable batteries 22 connected in series, the voltage detection section 12 detects the total voltage of all the series connected batteries. However, voltage can also be detected for each battery module that makes up the battery unit 20. The voltage detection section 12 outputs detected voltage as an analog signal to the computation section 18, or the analog signal is converted to a digital signal via an analog-to-digital converter (AND converter) and output to the computation section 18. The voltage detection section 12 detects battery voltage at a fixed sampling rate or continuously, and outputs the detected voltage to the computation section 18. The computation section 18 can average a plurality of voltage values input over a set time period, compute state of charge with the averaged voltage values, and thereby accurately compute the state of charge. The set time period for this method is, for example, 5 seconds, or from 1 second to 10 seconds.

The temperature detection section 14 is provided with a temperature sensor 17 to detect the temperature of batteries housed in the battery unit 20. The temperature sensor 17 contacts a battery surface, contacts a battery via heat conducting material, or is in close proximity to a battery surface for thermal connection to detect battery temperature. The temperature sensor 17 is a thermistor. However, any device that can convert temperature to electrical resistance, such as a PTC device or varistor, can be used as the temperature sensor 17. Further, a device that can detect temperature without contact to the battery, such as a device that detects infrared radiation emitted from the battery, can also be used as the temperature sensor 17. The temperature detection section 14 also outputs detected battery temperature as an analog signal to the computation section 18, or the analog signal is converted to a digital signal via an A/D converter and output to the computation section 18. The temperature detection section 14 detects battery temperature at a fixed sampling rate or continuously, and outputs the detected battery temperature to the computation section 18.

The current detection section 16 has a resistive element connected in series with the batteries, and detects the voltage developed across both terminals of that resistive element to detect discharging current flow through the batteries. The resistive element is a low value resistor. However, semiconductors, such as a bipolar transistor or field effect transistor (FET) can also be used as the resistive element. Since the direction of current flow is opposite for battery charging current and discharging current, the polarity of the voltage developed across the resistive element is reversed for charging and discharging. Consequently, the polarity of the voltage across the resistive element can determine if the current is charging current or discharging current, and the amount of the voltage across the resistive element can detect the magnitude of the current. This is because current is proportional to the voltage developed across the resistive element. This type of current detection section 16 can accurately detect discharging current. However, the current detection section 16 can also be a structure that detects current by detecting magnetic flux external to the current flow inside a wire lead. The current detection section 16 also outputs detected discharging current as an analog signal to the computation section 18, or the analog signal is converted to a digital signal via an A/D converter and output to the computation section 18. The current detection section 16 detects discharging current at a fixed sampling rate or continuously, and outputs the detected discharging current to the computation section 18.

An apparatus, which outputs digital signals from the voltage detection section 12, the temperature detection section 14, and the current detection section 16 to the computation section 18 at a fixed sampling rate, can offset the timing of the digital signal from each detection section to sequentially output the digital signals to the computation section 18.

[method of determining the state of charge of the battery]

In a power source apparatus for driving a motor in a car, battery charging and discharging current limit values are determined by the state of charge of the battery, and charging and discharging are performed with currents that are smaller than those current limit values. Charging and discharging current limit values set the maximum currents allowed for charging and discharging while reducing battery degradation. Charging and discharging current limit values determined by the state of charge set limits for both periods of battery charging and periods of discharging. Batteries have the property that they are markedly degraded by over-charging and over-discharging. However, even when a battery is not over-charged or over-discharged, it becomes more easily degraded during charging as it approaches full charge, and it becomes more easily degraded during discharging as it approaches complete discharge. Consequently, as the state of charge of the battery increases during charging and approaches full charge, the maximum current limit value based on the state of charge is decreased, and as the state of charge of the battery decreases during discharging, the maximum current limit value is also decreased.

A first state of charge (SOC1) and a second state of charge (SOC2) are detected to find current limit values for charging and discharging. The first state of charge is computed by detecting battery charging current and discharging current and integrating those detected currents. The first state of charge subtracts battery discharge capacity from charge capacity to compute the remaining capacity or state of charge. Charge capacity is computed by integrating charging current. Discharge capacity is computed by integrating discharging current. A method that computes the state of charge from charge capacity and discharge capacity can compute state of charge when the rechargeable batteries 22 are lithium ion batteries, nickel hydrogen batteries, or nickel cadmium batteries.

Although the first state of charge (SOC1) is computed by integrating current, the second state of charge (SOC2) is determined by battery voltage. Charging and discharging current limit values are determined from the two states of charge (SOC), namely the first state of charge (SOC1) and the second state of charge (SOC2). These computations are performed by the computation section 18.

The computation section 18 integrates battery discharging current to determine discharge capacity, and computes the first state of charge by subtracting that discharge capacity. As described later, the computation section 18 also computes the second state of charge from battery voltage. In addition, the computation section 18 determines charging and discharging current limit values from the first and second states of charge. For example, if a battery with a full charge capacity of 1000 mAh is discharged for 500 mAh, the remaining capacity or state of charge becomes 50%. Accordingly, as a fully charged battery is discharged, the state of charge gradually decreases. Information such as prescribed values and other data necessary for the computation section 18 to compute the first and second states of charge are stored in memory 11 connected to the computation section 18. Non-volatile memory such as E²PROM (electrically erasable programmable memory) or volatile memory such as RAM (random access memory) can be used as the memory 11.

[First State of Charge]

The first state of charge is the state of charge found by integrating current. The computation section 18 measures battery current, voltage, and temperature with a specified time period (sampling period), and computes the state of charge based on those values. In this example, a current value measured by the current detection section is multiplied by the measurement time (sampling period) to find a quantity of electric charge. Further, that quantity is multiplied by charging efficiency determined by battery temperature and the immediately prior SOC value. The resulting values are accumulated over time to compute the first state of charge (SOC1) as follows.

SOC1=(previous SOC1)+((measured current value)*(current measurement time)*(charging efficiency))

In the present form of embodiment, charge efficiency is 1 during discharging. Charge efficiency is also 1 during charging in the low state of charge (SOC) range and when temperature is low. Charge efficiency is a value less than 1 in the high state of charge (SOC) range and when temperature is high.

[Second State of Charge]

Alternatively, the second state of charge is the state of charge determined from battery voltage. In this example, the second state of charge is found from battery voltage measured by the voltage detection section using a look-up-table (LUT) indicating the relation between battery voltage and SOC. Battery voltage to determine the second state of charge is measured in the same measurement period as the various data for the first state of charge. However, battery voltage to determine the second state of charge is an average of a plurality of voltage values detected over a set time period. A method that determines the state of charge from an average value of a plurality of battery voltages can determine state of charge with more accuracy. This is because battery voltage variation becomes larger than state of charge variation as time progresses during either charging or discharging.

An LUT for discharging has voltages for SOC of 0%, 10%, 20%, 30%, and 50%, and above that an SOC of 50% is assumed. This is for the following reason. In the operation of the car power source apparatus of the present embodiment, charging and discharging is controlled to keep battery SOC near 50%. The accuracy of the relation between battery voltage and SOC is relatively high for the case where a state discharge has continued for a long time or where charging has continued for a long time. During discharge if the SOC is 0% to 30% instead of normally being controlled near an SOC of 50%, it means discharging has continued for a long time and, therefore, the accuracy of the relation between battery voltage and SOC has become high. During discharge when the SOC is over 50%, the state of charging and discharging is such that discharge after charging has occurred for only a short time, and the accuracy of the relation between battery voltage and SOC is low. Further, when the SOC is over 50% during discharge, capacity is such that high current discharge is allowed. Therefore, current limit based on battery voltage is not required, and in this case the computation section 18 computes the value of the second state of charge based on battery voltage to be the same as the value of the first state of charge based on accumulated capacity. For a battery with a state of charge greater than or equal to 50%, even if the battery is discharged at high current, degradation is minimal.

For charging, there are voltages for SOC of 50%, 70%, 80%, 90%, and 100%, and below that an SOC of 50% is assumed. In the same manner as described above, during charging if the SOC is 70% to 80% instead of normally being controlled near an SOC of 50%, it means charging has continued for a long time and, therefore, the accuracy of the relation between battery voltage and SOC has become high. For a battery with an SOC less than 50% during charging, degradation is minimal even for high current charging because the state of charge is low. Therefore, it is not necessary to accurately detect the state of charge and accurately control charging and discharging current limit values for a battery in that voltage range. Consequently, in the case of battery voltage during charging with an SOC less than 50%, the computation section 18 computes the value of the second state of charge based on battery voltage to be the same as the value of the first state of charge based on accumulated capacity.

The second state of charge is determined from battery voltage using the discharging LUT when discharge current is being measured and the charging LUT when charging current is being measured. Further, different battery voltage is obtained even at the same SOC depending on battery temperature and charging and discharging current values. Therefore, depending on battery temperature and current value, a plurality of different LUTs are used for each LUT to find SOC2.

Figure 2:
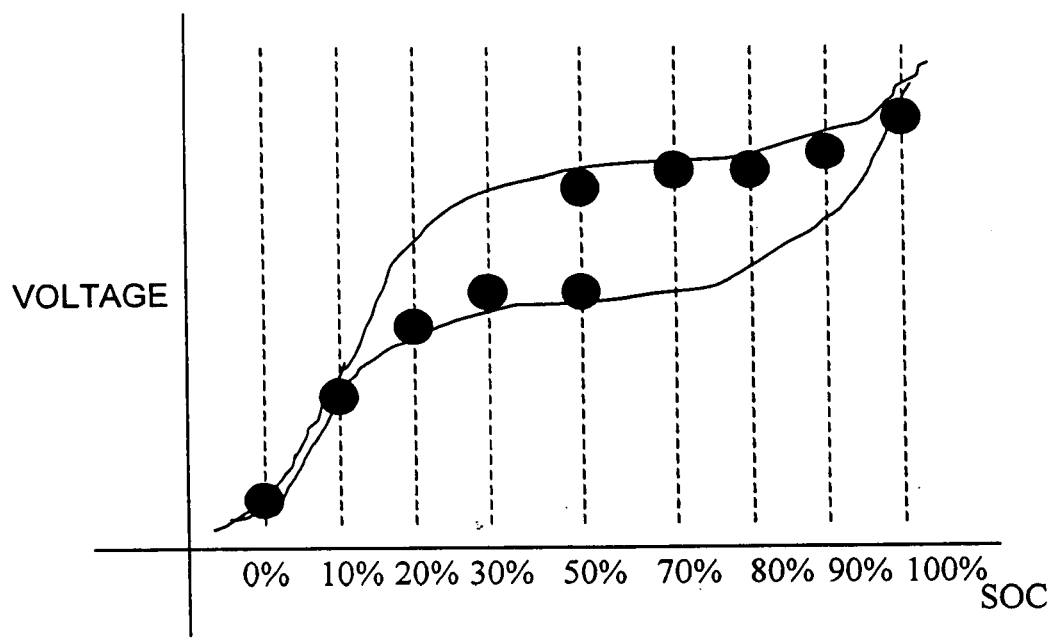
FIG. 2 is a graph showing the relation between battery voltage and state of charge (SOC)

FIG. 2 is a graph showing the relation between battery voltage and state of charge. Each point shown in FIG. 2 has a voltage table for different temperatures and currents. Further, Table 1 and Table 2 are examples of tables showing the association of estimated state of charge for each given battery voltage. Tables are prepared for each temperature. As an example, Table 1 shows the relation between charging current value and state of charge at a battery temperature of 0° C., and Table 2 shows the relation between discharging current value and state of charge at a battery temperature of 10° C. For example, in Table 1, if battery temperature is 0° C., charging current is 15 A, and battery voltage is 7.92V, the second state of charge, SOC2, is 90%. For the tables used in the present embodiment, linear interpolation is used for each data point in the tables.

In addition, for these types of battery voltage versus state of charge graphs, voltage tables, and battery voltage versus state of charge tables, graphs and tables adjusted according to accumulated time of operation can also be used. For a nickel hydrogen battery, as accumulated time of operation increases, voltage at the same SOC increases.

TABLE 1

| | SOC | | | | |
|---|---|---|---|---|---|
| current | 50% | 70% | 80% | 90% | 100% |
| 1 A | 7.39 V | 7.50 V | 7.56 V | 7.69 V | 7.84 V |
| 2 A | 7.45 V | 7.55 V | 7.62 V | 7.74 V | 7.90 V |
| 5 A | 7.50 V | 7.61 V | 7.68 V | 7.80 V | 7.96 V |
| 10 A | 7.55 V | 7.66 V | 7.73 V | 7.86 V | 8.02 V |
| 15 A | 7.60 V | 7.71 V | 7.79 V | 7.92 V | 8.09 V |
| 20 A | 7.65 V | 7.77 V | 7.84 V | 7.97 V | 8.25 V |

TABLE 2

| current | SOC | | | | |
|---|---|---|---|---|---|
| | 0% | 10% | 20% | 30% | 50% |
| 1 A | 5.38 V | 5.67 V | 5.94 V | 6.07 V | 6.20 V |
| 2 A | 5.30 V | 5.60 V | 5.88 V | 6.01 V | 6.14 V |
| 5 A | 5.24 V | 5.54 V | 5.82 V | 5.95 V | 6.08 V |
| 10 A | 5.18 V | 5.48 V | 5.76 V | 5.89 V | 6.02 V |
| 15 A | 5.12 V | 5.42 V | 5.70 V | 5.83 V | 5.96 V |
| 20 A | 5.06 V | 5.36 V | 5.64 V | 5.77 V | 5.93 V |

Although the method above determines the second state of charge from battery voltage using tables, the second state of charge can also be computed from battery voltage using functional relations. These are functions to compute the second state of charge with battery voltage as a parameter, or functions to compute the second state of charge with battery voltage and battery temperature as parameters, and they are pre-stored in memory.

As described above, battery charging and discharging current limit values are determined from two SOC (states of charge). The two states of charge are SOC1 computed by integrating current, and SOC2 estimated based on battery voltage.

In general, the SOC of a battery cannot be accurately determined under all conditions based on battery voltage alone. It is well known that even at the same SOC, a battery can show different voltages depending on factors such as its operational history up to that point. However, in the range of high SOC during charging, namely in the range of the first state of charge near 100%, and in the range of low SOC during discharging, namely in the range of the first state of charge near 0%, SOC can be estimated from battery voltage with relatively high accuracy. In these ranges of high SOC during charging and low SOC during discharging, batteries are easily degraded. Consequently, it is important to accurately control charging and discharging current limit values for batteries in these state of charge ranges.

In a method that determines state of charge based on battery voltage during charging when the state of charge is in a range greater than a set SOC, for example 50%, and based on battery voltage during discharging when the state of charge is in a range less than the set SOC, the state of charge can be accurately determined in the range of high SOC during charging and low SOC during discharging where batteries can be easily degraded. Accurate control of charging and discharging current limit values in the SOC range where batteries can be easily degraded has the effect of reducing battery degradation and extending battery lifetime.

[Charging and Discharging Current Limit Values]

There are essentially two methods of determining charging and discharging current limit values from the first state of charge and the second state of charge. Method one finds first charging and discharging current limit value candidates from the first state of charge, and second charging and discharging current limit value candidates from the second state of charge. Method one compares the first and second charging and discharging current limit value candidates and selects the smaller current values as the battery charging and discharging current limit values. Since method one determines first and second charging and discharging current limit value candidates from the first and second states of charge, compares current values, and chooses the smaller current values as current limit values, various corrections can be made in operations to determine charging and discharging current limit values from the states of charge, and the corrected current values can be compared.

Method two finds the maximum charging current value for battery charging from the larger state of charge between the first and second states of charge. Method two finds the maximum discharging current value for battery discharge from the smaller state of charge between the first and second states of charge. Since method two finds the smaller current value determined from the first and second states of charge for both battery charging and discharging, it is in substance similar to method one. However, method two does not find charging and discharging current limit values from the first and second states of charge, but rather selects the state of charge that results in the smaller charging and discharging current limit values to find the charging and discharging current limit values.

Figure 3:
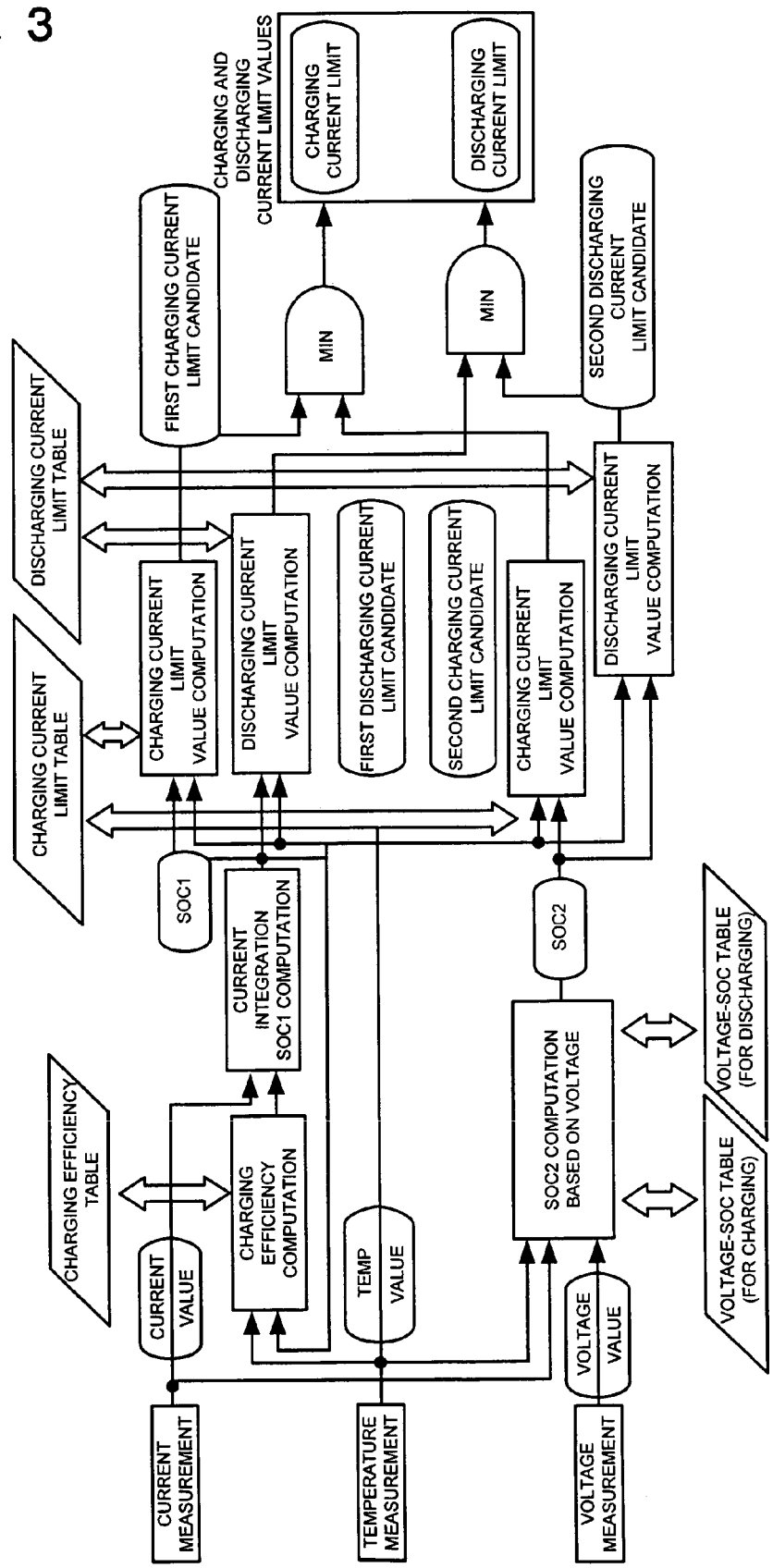
FIG. 3 is a flow-chart showing an embodiment related to the method of controlling battery current limiting of the present invention.

A method (method one) of determining battery charging and discharging current limit values is described below based on FIG. 3. Here, battery charging and discharging current limit values are determined from first charging and discharging current limit value candidates found from the first state of charge, and second charging and discharging current limit value candidates found from the second state of charge.

It is necessary to control the maximum value of charging current and the maximum value of discharging current, namely charging and discharging current limit values, based on the state of charge and temperature of the battery. A method, which determines charging and discharging current limit values according to battery state of charge, reduces maximum charging current for a battery with a high state of charge to avoid risk at full charge and the danger of overcharging. Similarly, the method reduces maximum discharging current for a battery with a low state of charge to avoid the danger of over-discharging.

A method, which determines charging and discharging current limit values according to battery temperature, reduces charging and discharging current limit values when battery temperature becomes low. This is because temperature rise and fall due to charging and discharging becomes abrupt for a battery at low temperature, and the usable range of the battery (range of the state of charge) becomes narrow. Charging and discharging current limit values are reduced for a battery at high temperature as well. This is because although the battery's capability increases at high temperature, battery degradation is greater for high temperature operation, and operation further raises temperature allowing the possibility of thermal run-away.

Battery charging and discharging current limit values are determined from state of charge and temperature using an LUT. An LUT for charging current and an LUT for discharging current are stored in memory. The charging current LUT is used to determine charging current limit values during battery charging and discharging from the state of charge and temperature. The discharging current LUT is used to determine discharging current limit values during battery charging and discharging from the state of charge and temperature.

Table 3 and Table 4 are tables to determine charging and discharging current limit values corresponding to the state of charge and temperature of the battery. Table 3 is used for charging current and Table 4 is used for discharging current. Based on these tables, the first charging and discharging current limit value candidates are determined from the first state of charge, and the second charging and discharging current limit value candidates are determined from the second state of charge.

TABLE 3

| battery temperature [° C.] SOC[%] | -10 | 0 | 10 | 15 | 25 | 35 | 45 | 55 |
|---|---|---|---|---|---|---|---|---|
| 20 | 21 | 33 | 52 | 69 | 91 | 100 | 100 | 0 |
| 30 | 20 | 31 | 48 | 64 | 83 | 99 | 100 | 0 |
| 40 | 19 | 29 | 45 | 59 | 77 | 93 | 100 | 0 |
| 50 | 18 | 28 | 42 | 55 | 72 | 88 | 100 | 0 |
| 60 | 17 | 26 | 40 | 51 | 67 | 83 | 99 | 0 |
| 70 | 15 | 23 | 34 | 43 | 58 | 74 | 90 | 0 |
| 80 | 0 | 0 | 0 | 0 | 0 | 0 | 0 | 0 |

TABLE 4

| battery temperature [° C.] SOC[%] | -10 | 0 | 10 | 15 | 25 | 35 | 45 | 55 |
|---|---|---|---|---|---|---|---|---|
| 20 | 0 | 0 | 0 | 0 | 0 | 0 | 0 | 0 |
| 30 | 22 | 45 | 79 | 107 | 135 | 140 | 140 | 0 |
| 40 | 24 | 50 | 89 | 121 | 140 | 140 | 140 | 0 |
| 50 | 24 | 51 | 91 | 124 | 140 | 140 | 140 | 0 |
| 60 | 24 | 50 | 90 | 125 | 140 | 140 | 140 | 0 |
| 70 | 24 | 50 | 90 | 125 | 140 | 140 | 140 | 0 |
| 80 | 24 | 50 | 89 | 123 | 140 | 140 | 140 | 0 |

[First Charging and Discharging Current Limit Value Candidates]

The computation section 18 uses Table 3 and Table 4 to determine the first charging and discharging current limit value candidates from the first state of charge of the battery. Table 3 is used to determine the first charging current limit value candidate corresponding to the first state of charge. Table 4 is used to determine the first discharging current limit value candidate corresponding to the first state of charge.

[Second Charging and Discharging Current Limit Value Candidates]

In the same manner as for the first charging and discharging current limit value candidates, the computation section 18 uses Table 3 and Table 4 to determine the second charging and discharging current limit value candidates from the second state of charge of the battery. Table 3 is used to determine the second charging current limit value candidate corresponding to the second state of charge. Table 4 is used to determine the second discharging current limit value candidate corresponding to the second state of charge.

[Charging and Discharging Current Limit Values]

As described above, the computation section 18 continuously determines first and second charging and discharging current limit value candidates from the first and second states of charge. In addition, the computation section 18 takes the smaller of the first and second charging current limit value candidates as the charging current limit value for battery charging. The computation section 18 also takes the smaller of the first and second discharging current limit value candidates as the discharging current limit value for battery discharge. In this manner, the computation section 18 takes the smaller of the first and second charging and discharging current limit value candidates as the charging and discharging current limit values for battery charging.

The established charging and discharging current limit values are sent to the car control section by the communication section 19 via the connected equipment communication terminals 30.

In this manner, charging and discharging current limit values are determined from the state of charge of the battery, and based on the determined charging and discharging current limit values, maximum current values for battery charging and discharging are limited and controlled. This allows battery degradation to be effectively prevented and battery life to be extended.

The method of controlling battery current limiting of the present invention is suitable for application in a high current, high output power source apparatus such as a car power source apparatus for a hybrid car or electric car, etc. As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or equivalence of such metes and bounds thereof are therefore intended to be embraced by the claims. This application is based on Application No. 2005-6815 filed in Japan on Jan. 13, 2005, the content of which is incorporated hereinto by reference.

What is claimed is:

1. A method of controlling battery current limiting that controls maximum battery charging and discharging current values according to the state of charge of the battery comprising:
   integrating battery charging and discharging current to compute a first state of charge, and determining first charging and discharging current limit value candidates from that first state of charge;
   computing a second state of charge based on battery voltage, and determining second charging and discharging current limit value candidates from that second state of charge; and
   taking the smaller charging and discharging current limit value candidates of the first charging and discharging current limit value candidates and the second charging and discharging current limit value candidates as the charging and discharging current limit values for charging and discharging the battery,
   wherein maximum charging current is reduced for a battery with a high state of charge, and maximum discharging current is reduced for a battery with a low state of charge.

2. A method of controlling battery current limiting as recited in claim 1 wherein the method of determining the second state of charge based on battery voltage determines the second state of charge based on battery voltage during charging when the state of charge is in a region greater than a set state of charge, and determines the second state of charge based on battery voltage during discharging when the state of charge is in a region less than a set state of charge.

3. A method of controlling battery current limiting as recited in claim 1 wherein the first state of charge is computed considering battery charging efficiency.

4. A method of controlling battery current limiting as recited in claim 1 wherein the second state of charge is determined based on a table of state of charge versus battery voltage.

5. A method of controlling battery current limiting as recited in claim 1 wherein the second state of charge is determined based on a function that relates state of charge to battery voltage.

6. A method of controlling battery current limiting as recited in claim 1 wherein an average value of voltage over a specified time is taken as the battery voltage to determine the second state of charge.

7. A method of controlling battery current limiting as recited in claim 2 wherein an average value of voltage over a specified time is taken as the battery voltage to determine the second state of charge.

8. A method of controlling battery current limiting as recited in claim 1 wherein the battery can be either a nickel hydrogen battery, nickel cadmium battery, or lithium ion rechargeable battery.

9. A method of controlling battery current limiting as recited in claim 1 wherein charging and discharging current limit values are limited according to the state of charge and temperature of the battery.

10. A method of controlling battery current limiting as recited in claim 8 wherein charging and discharging current limit values are determined according to state of charge and temperature using tables.

11. A method of controlling battery current limiting that controls maximum battery charging and discharging current values according to the state of charge of the battery comprising:
    integrating battery charging and discharging current to compute a first state of charge, and computing a second state of charge based on battery voltage;
    determining the maximum charging current value for battery charging based on the larger state of charge between the first state of charge and the second state of charge; and
    determining the maximum discharging current value for battery discharge based on the smaller state of charge between the first state of charge and the second state of charge,
    wherein maximum charging current is reduced for a battery with a high state of charge, and maximum discharging current is reduced for a battery with a low state of charge.

12. A method of controlling battery current limiting as recited in claim 11 wherein the method of determining the second state of charge based on battery voltage determines the second state of charge based on battery voltage during charging when the state of charge is in a region greater than a set state of charge, and determines the second state of charge based on battery voltage during discharging when the state of charge is in a region less than a set state of charge.

13. A method of controlling battery current limiting as recited in claim 11 wherein the first state of charge is computed considering battery charging efficiency.

14. A method of controlling battery current limiting as recited in claim 11 wherein the second state of charge is determined based on a table of state of charge versus battery voltage.

15. A method of controlling battery current limiting as recited in claim 11 wherein the second state of charge is determined based on a function that relates state of charge to battery voltage.

16. A method of controlling battery current limiting as recited in claim 11 wherein an average value of voltage over a specified time is taken as the battery voltage to determine the second state of charge.

17. A method of controlling battery current limiting as recited in claim 11 wherein the battery can be either a nickel hydrogen battery, nickel cadmium battery, or lithium ion rechargeable battery.

18. A method of controlling battery current limiting as recited in claim 11 wherein charging and discharging current limit values are limited according to the state of charge and temperature of the battery.

19. A method of controlling battery current limiting as recited in claim 17 wherein charging and discharging current limit values are determined according to state of charge and temperature using tables.

* * * * *